Nov. 2, 1948.                J. H. NEWITT                2,452,675
                        DIRECTION FINDING SYSTEM
                           Filed May 4, 1946
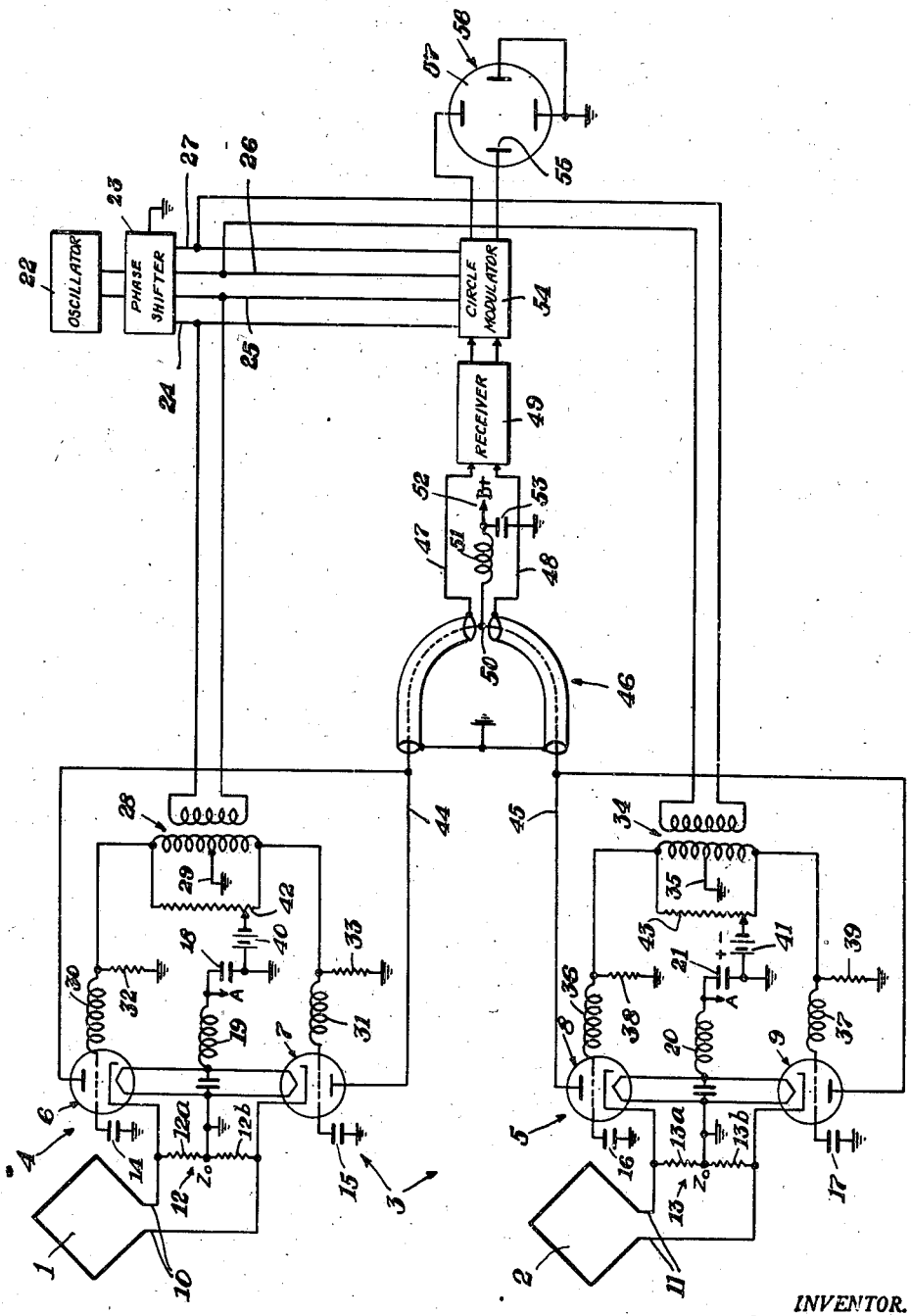
INVENTOR.
JOHN H. NEWITT
BY
ATTORNEY Patented Nov. 2, 1948

2,452,675

UNITED STATES PATENT OFFICE 2,452,675

DIRECTION FINDING SYSTEM

John H. Newitt, Maplewood, N. J., assignor to Federal Telephone and Radio Corporation, New York, N. Y., a corporation of Delaware Application May 4, 1946, Serial No. 667,273

1 Claim. (Cl. 343—121)

This invention relates generally to direction finding systems and particularly to electronic goniometers therefor.

An object of the present invention is the provision of an improved electronic goniometer.

Another object of the present invention is the provision of an improved device for combining the output derived according to two radiant action patterns from an antenna system.

Another object of the present invention is the provision of an electronic goniometer which is characterized by a very high degree of balance.

Another object of the present invention is the provision of an electronic goniometer in which matching of tubes is not necessary in order to obtain radio frequency balance as the electronic goniometer according to the present invention is very uncritical in operation as regards balance.

Another object of the present invention is the provision of an improved direction finding system employing an electronic goniometer embodying my present invention.

In accordance with a feature of the present invention, the electronic goniometers are comprised of two balanced modulators. For satisfactory operation of the electronic goniometer and for proper balance of each of the balanced modulators, it has heretofore been considered necessary to very carefully match the tubes contained in the balanced modulators. Even with this precaution, such modulators have been critical in regard to balance in respect to the voltages applied, tube characteristics, and other parameters.

A further object of the present invention is the provision of an improved balanced modulator.

A still further object of the present invention is the provision of a balanced modulator which is not critical in operation in respect to radio frequency balance.

Other and further objects of the present invention will become apparent and the invention itself will be best understood from the following description of an embodiment thereof, reference being had to the drawing, in which the figure is a schematic and block diagram of a direction finder including an electronic goniometer in accordance with the present invention.

Referring now to the figure, directive reception patterns such as for example, crossed figure-of-eight radiant action patterns, may be produced by any suitable means such as for example, loop antennas 1 and 2 which are crossed and arranged at right angles to each other and which may operate in conjunction with a sensing antenna (not shown).

The radiation pattern produced by loop antennas 1 and 2 may be effectively rotated by means of an electronic goniometer generally designated by the numeral 3, which consists of two balanced modulators 4 and 5 associated with loops 1 and 2 respectively. Balanced modulators 4 and 5 each include two tubes 6 and 7, and 8 and 9, respectively which tubes may be triodes of the indirectly heated type, and which preferably may be disk-sealed tubes of low inter-electrode capacity and low impedance leads, such as for example, the well-known lighthouse tube.

In accordance with the present invention, the loop antennas 1 and 2 are connected by transmission lines 10 and 11 to matching terminating resistors 12 and 13, each having a value equivalent to the characteristic impedance of lines 10 and 11. Resistors 12 and 13 also serve as the cathode resistors for the tubes in balanced modulators 4 and 5 respectively. For this purpose, resistor 12 is divided into two halves 12a and 12b with one end of 12a coupled to the cathode of tube 6 and with one end of 12b coupled to the cathode of tube 7. The mid-point between these halves is connected to a point of reference potential or ground. Likewise resistor 13 is divided into two halves 13a and 13b with the free ends of each half being connected to the cathodes of tubes 8 and 9 respectively and the connecting point between the two halves being grounded. The signal energy derived from loops 1 and 2 is impressed upon tubes 6 and 7, and 8 and 9 by application of said signals across the cathode resistor to the cathodes of said tubes. The cathodes are maintained at an R. F. level above ground. On the other hand, the grids of tubes 6, 7, 8 and 9 are maintained at ground radio frequency potential by means of condensers 14—17 which couple said grids to ground at the operating radio frequency. This frequency, which is the carrier frequency of the incoming signal picked up by loop antennas 1 and 2 may be for example as high as 150 megacycles or higher.

The heaters or filaments of tubes 6 and 7 are connected in parallel, with one side being connected to ground directly and the other side being connected through a condenser 18 to ground through a radio frequency choke coil 19. Similarly the filaments of tubes 8 and 9 are connected in parallel with one side being connected to ground and the other side being connected in series with a choke coil 20 and a condenser 21 to ground. The choke coils 19 and 20 serve to isolate the radio frequency currents in the parallel connected filaments of balanced modulators 4 from that in balanced modulator 5.

To provide for effective shifting of the radiant action patterns of antennas 1 and 2, or to modulate the balanced modulators 4 and 5, modulating voltages are derived from an oscillator 22 which may be operated at a relatively low frequency such as for example 150 cycles per second or at whatever frequency it is desired to effectively rotate the directional patterns of antennas 1 and 2. The output of oscillator 22 is fed to a phase shifter 23 which shifts one of its outputs 90° with respect to the other so that the output leads 24 and 25, which are balanced with respect to ground, are 90° out of phase with output leads 26 and 27 which are likewise balanced with respect to ground. Leads 24 and 25 which are 180° out of phase with each other are connected to the primary of a transformer 28 whose tapped secondary has its tap connected to ground as at 29 and the ends of which secondary are connected in series with radio frequency choke coils 30 and 31 to the grids of tubes 6 and 7 respectively. The ends of the secondary of transformer 28 are also connected through grid resistors 32 and 33 to ground.

The low frequency or modulating energy from oscillator 22, which has been phase shifted in phase shifter 23, is applied through leads 26 and 27 to the primary of a transformer 34 whose tapped secondary has the tap connected to ground and the two loose ends of said secondary connected in series with radio frequency choke coils 36 and 37 respectively to the grids of tubes 8 and 9. These ends are also connected through grid resistors 38 and 39 to ground. Thus the modulating voltages are applied to modulators 4 and 5. While condensers 14—17 ground the grids of tubes 6—9 at radio frequency, these condensers have a substantial reactance at the low frequency of the modulating voltages derived from oscillator 22 and consequently these grids are substantially above ground potential at said low frequency.

To balance balanced modulators 4 and 5, two sources of balancing voltages 40 and 41 have their positive sides connected to ground and their negative sides connected respectively to the arms of potentiometers 42 and 43 whose resistors are respectively connected across the secondaries of transformers 28 and 34. By adjusting the potentiometer arms, the Gm curves of tubes 6 and 7 and of tubes 8 and 9 are adjusted to equality.

Since the grids of the tubes are substantially at ground potential with reference to the radio frequency energy, there is negligible inter-electrode coupling between the input and output circuits of each tube, the only coupling therebetween being through the electronic stream. Since the coupling due to the electronic streams of the tubes is balanced by adjusting the potentiometers, it will be seen that radio frequency balance of each of the modulators is readily obtained and does not depend upon electrically or capacitively matching the tubes.

The anodes of tubes 6 and 7 are connected together by a line 44 while the anodes of tubes 8 and 9 are connected together by a line 45, line 44 being connected to one end, and line 45 is connected to the other end of a transmission line type of transformer 46, the output lines 47 and 48 of transformer 46 being connected to the usual type of direction finding receiver 49. Leads 44 and 45 are arranged to be as short as possible. For this purpose the anode tube socket prongs of tubes 6 and 7 are connected together as by soldering. Tubes 8 and 9 are similarly connected. Plate voltage for the anodes is provided by connecting the midpoint 50 of the effective primary of the transmission line transformer 46 through a choke coil 51 to the positive side of a source of voltage 52, with a by-pass condenser 53 being used to by pass the radio frequency current to ground. The mid-point of the effective secondary is likewise connected to ground. Due to the use of transmission line transformer 46, the plate circuit is of high plate impedance whereby high amplification is obtained, while on the other hand, the output of transformer 46 is of low impedance which is desirable for a receiver designed to operate on a high frequency input of (for example) over 100 megacycles. The output of the receiver, which may be a conventional receiver of the super-heterodyne type, including a demodulator or detector, is then fed to a modulator 54. The modulator 54 is also fed by leads 24—27 with sinusoidal modulating voltages derived from oscillator 22 and phase shifted in phase shifter 23. These voltages from phase shifter 23 are applied through the modulator 54 to the deflection plates 55 of a cathode ray tube 56. These voltages tend to produce a rotation of the beam, and a circular trace on the screen 57 of the cathode ray tube. However, these voltages are modulated whenever energy is being received on receiver 49 to produce a radial deflection of the trace indicating the direction from which signals arrive.

While I have described the specific details of one embodiment of my invention, it will be apparent that many changes may be made in these details in view of the teachings therein. For example, in place of the crossed loops 1 and 2, an Adcock array may be substituted. Furthermore instead of using triodes in the electronic goniometer 3, other types of tubes such as for example, pentodes may be used in place thereof. Accordingly, while I have described above the principles of my invention in connection with specific apparatus, it is to be clearly understood that this description is made only by way of example and not as a limitation on the scope of my invention.

I claim:

A radio direction finder comprising a pair of antennas having different radiant action directivities; a source of low frequency energy having a dual output of which one output is substantially 90° out of phase with the other; a pair of balanced modulators for modulating radio frequency energy derived from one of said antennas with the relatively low frequency energy of one phase from said low frequency source, each modulator comprising a pair of electron discharge devices each having an anode, cathode, and control electrode, a pair of cathode resistors each connected at one end to one of said cathodes and at the other end to ground, means for coupling one of said antennas to said cathodes in push-pull, means for applying the low frequency energy of one phase from said low frequency source to said control electrodes in push-pull, means grounding said control electrodes at said radio frequency but offering a substantial impedance at said low frequency, and means coupling said anodes together; a direction finding receiver, a transformer having each end of its primary connected to a separate pair of anodes in a separate one of said balanced modulators, means coupling the secondary of said transformer to said receiver, a cathode ray tube, means coupling energy from said low frequency source to produce a deflection of the beam in said cathode ray tube, and means coupling the output of said receiver to said cathode ray tube to modulate said deflection.

JOHN H. NEWITT.

REFERENCES CITED

The following references are of record in the file of this patent:

UNITED STATES PATENTS

| Number | Name | Date |
|---|---|---|
| 2,101,438 | Lindenblad | Dec. 7, 1937 |
| 2,290,958 | Hagen | July 28, 1942 |
| 2,399,586 | Toomin | Apr. 30, 1946 |
| 2,403,967 | Busignies | July 16, 1946 |
| 2,406,800 | Busignies | Sept. 3, 1946 |
| 2,408,039 | Busignies | Sept. 24, 1946 |